(12) United States Patent
Haynes

(10) Patent No.: X8390
(45) Date of Patent: Sep. 1, 1834

(54) BENCH, PERPETUAL SHOE

(76) Inventor: Samuel Haynes

Samuel Haynes
Letters Patent

The Schedule referred to in these Letters Patent and making part of the same containing a description in the words of the said Samuel Haynes himself of his improvement in the art of Manufacturing Boots and Shoes which he calls "The perpetual Shoe Bench."

---

To all persons to whom these presents shall come

Samuel Haynes of Malden in County of Middlesex and State of Massachusetts, Manufacturer of Boots and Shoes sends greeting. Be it known, that I, the said Samuel Haynes have invented, constructed, made and applied to use a new and useful improvement in the art of Manufacturing Boots and shoes which I call "The perpetual Shoe Bench". My said invention or improvement is plainly and fully specified and described in the words and figures following, to wit: My Bench and any part of it may be made of Mahogany, oak or any other wood, or of iron or any other metal. My Benches are about three feet high, or they may be made of any other height to suit the taste of the operator. The lower part of the Bench is a Plank or other platform as is represented by the letter A. drawing No. 1 of the width of about three feet, and of the desired length of the Bench. it lies on the floor of the workshop and must be of sufficient thickness to receive and hold firmly the standards, shafts, uprights that proceed from it to support the upper platform or working Bench. B. B. B. &c are the standards, shafts or, uprights standing at right angles on the lower platform on the centre of it extending to one third of its width, well secured to and through it about four inches in width and proceeding upright from the lower platform up to and through the upper platform or working bench grooved in the front a[illegible] back part in that portion of it that rises above the working bench in a convenient manner to receive and hold firm the heel and fore part of the shoe. The centre parts of these standards, shafts or uprights are to a convenient distance below the working bench cut down so that the strap may be attached to the Shoe and play easily and freely. C. C. C. is the upper platform or working Bench. It is about two inches thick in my apparatus and proceeds from the front side of the standards, shafts or uprights back to a line even with the the back side of the lower platform. Through this in notches or slots of suit-
able dimentions, the standards proceed and are well secured therein. A, is a
board descending 6 or 8 inches from the front side of the working bench and
on the front sides or edges of the uprights or standards and securely fastened to the
front side of the working bench, and to the uprights. b, is a ledge on the back side
of the working bench two or three inches high made merely for the convenience
of the operator to prevent his tools & materials from falling off on the opposite side.
D, D, D, &c are the shoes or boots placed on the grooves of the uprights and arrang-
ed at a convenient distance above the working bench for the operator. C, C, C, &c
are leather straps attached at the upper end to the projecting parts of the lasts by
hooks inserted into holes bored through the projecting parts of the lasts, or by pro-
ceeding through loops of leather temporarily fastened to the shoe or boot & last over
the instep and hanging down as the shoe is placed & projecting downward far
enough for the strap to pass through it. The strap then passes down to and
around the bars or levers d, d, d, &c The bars or levers d, d, d, &c are fastened to the
lower platform on the back side by leathern or other hinges and on the front
side they play up and down at pleasure. e, e, e, &c are catches or flanches,
fastened to the standards or uprights under which the bar, d, is brought at
pleasure by the foot of the operator. The strap c, must be so adjusted that
when the front of the bar, d, is brought down it may readily pass under the
catch e, so that the shoes will be held firmly in the grooves of the uprights
above the working bench. The uprights and of course the shoes thus firm-
ly secured in the grooves above the working bench are placed one foot apart.
The number of the shoes placed on the bench for one operation as represented
in the plans and model herewith sent is ten, — but it is obvious that they
may be multiplied to any desired number by increasing the length of the
bench. Figures or drawings N° 1 & 2 represent the bench and its prom-
inent parts — and the shoes and boots or the lasts with the leather on them
fit for operation in different positions which cannot be mistaken by any me-
chanic on inspecting the drawings. Some parts of the machinery herein repre-
sented and described have been heretofore known and used. I believe some parts
of it are new, but not being sure of this, I herein claim no particular part of the
machinery as constituting my invention. But my invention which I hereby
claim claim and for the exclusive right to use which I now desire Letters Patent is
a Combination of Machinery to produce a new and useful result. The decid-
ed utility of my invention consists in this. When the bench is prepared with
ten or more places for shoes on it, the lasts with the leather placed therein in
its first State for Manufacture should be secured in the grooves. The operator
should then successively stitch the upper leather to the inner soles on all of them
next the soles should be placed on all the shoes, and the operator should peg
on all the soles successively, and so of the heels, polishing and finishing.
In this mode with my combination of Machinery, by working on many shoes
successively in each part of the manufacture, and in avoiding the frequent
changes of the materials and the positions of the shoes by the operator, he will
be able in a given time to manufacture and finish and complete, in a thor-
ough and workman like manner more than double the number of shoes or
boots that he could finish in the usual modes of manufacture now in use.
For making boots the front of the standard or upright from below where it pass-
es through the working bench must be detached therefrom sufficiently to
let the boot leg descend over it while the boot is in the operation of Manu-
facture.

In testimony that the above is a true specification of my said invention
or improvement I have hereunto set my hand this thirteenth day of August
in the year of Our Lord one thousand eight hundred and thirty four   Exd
Witnesses   W.H.
George W. Adams   Sam Haynes
Augustus Peabody   Drawing 1343 [illegible]